US006926786B2

(12) United States Patent
Frost et al.

(10) Patent No.: US 6,926,786 B2
(45) Date of Patent: Aug. 9, 2005

(54) METHOD FOR MAKING A LAMINATED GLASS SHEET

(75) Inventors: Thorsten Frost, Alsdorf (DE); Stefan Immerschitt, Herzogenrath (DE); Franz Kraemling, Aachen (DE); Philippe Leclercq, Morsang sur Orge (FR); Laurent Poncet, Compiegne (FR); Heinz Schilde, Wurselen (DE)

(73) Assignee: Saint-Gobain Vitrage, Courbevoie (FR)

( * ) Notice: Subject to any disclaimer, the term of this patent is extended or adjusted under 35 U.S.C. 154(b) by 513 days.

(21) Appl. No.: 10/077,788

(22) Filed: Feb. 20, 2002

(65) Prior Publication Data

US 2002/0094407 A1 Jul. 18, 2002

Related U.S. Application Data

(62) Division of application No. 09/147,419, filed as application No. PCT/FR98/00808 on Apr. 23, 1998, now Pat. No. 6,352,754.

(30) Foreign Application Priority Data

Apr. 24, 1997 (FR) .............................................. 97 05066

(51) Int. Cl.⁷ .............................................. B32B 31/18
(52) U.S. Cl. ........................ 156/101; 156/106; 156/253; 156/257; 156/268; 156/269
(58) Field of Search ........................... 156/99, 101–102, 156/106, 253, 257, 268–269; 428/189, 192, 77–78, 138, 426, 430, 432, 437; 52/171.2, 786.11, 786.12; 296/84.1; 219/203

(56) References Cited

U.S. PATENT DOCUMENTS

| 3,794,809 A | 2/1974 | Beck et al. |
| 5,320,893 A | 6/1994 | Floyd |
| 5,620,799 A | 4/1997 | Sauer |

FOREIGN PATENT DOCUMENTS

| EP | 0 724 955 | 8/1996 |
| WO | WO 85/01725 | 4/1985 |

*Primary Examiner*—Jessica Rossi
(74) *Attorney, Agent, or Firm*—Oblon, Spivak, McClelland, Maier & Neustadt, P.C.

(57) ABSTRACT

In a method for making laminated glass, a sheet includes two glass substrates with an interlayer sheet between them. This sheet includes a polymer based film provided on one of the surfaces with a thin functional layer. The sheet is cut out in dimensions substantially identical to or greater than one of the glass substrates. The sheet is slit on at least the thickness of the film provided with the functional layer so as to delimit at least a peripheral zone of the film located between the slitting line and its edge. The interlayer sheet is assembled between the glass substrates. The peripheral zone is then detached by mechanical traction to transform the laminated glass sheet.

22 Claims, 3 Drawing Sheets

METHOD FOR MAKING A LAMINATED GLASS SHEET

CROSS REFERENCE TO RELATED APPLICATION

This application is a division of U.S. Application Ser. No. 09/147,419, now U.S. Pat. No. 6,352,754.

BACKGROUND OF THE INVENTION

1. Field of the Invention

The present invention relates to a process for manufacture of laminated glazing units, especially those designed as equipment for vehicles of the windshield type. It relates more particularly to laminated glazing units in which the intermediate film, which is a polymer-base material disposed between rigid substrates, generally of glass, is provided with a coating having thermal properties, especially of reflection in the infrared, thus endowing these glazing units with a highly satisfactory function of protection against solar radiation.

2. Discussion of the Background

Such configurations of glazing units are known in particular from the following patents: U.S. Pat. No. 4,639,069, U.S. Pat. No. 4,369,945, EP 0303586 and WO 90/08334, wherein there are used intermediate films generally comprising a ply of transparent polymer of the polyethylene terephthalate type (PET), provided on one of its faces with the coating which reflects in the infrared, said ply being inserted between two plies of thermoplastic polymer of the polyvinyl butyral type (PVB) before the usual assembly of this multi-layer intermediate film together with the two glass substrates is performed.

A problem specific to this type of configuration soon became apparent, however: in choosing these "multi-layer intermediate films", with dimensions identical to those of the glass plates, the infrared-reflecting coating was disposed flush with the edge wall of the glass plates. This coating usually comprises layers which are susceptible to deterioration, especially to oxidation, in contact with moisture. This is particularly true for metallic layers, especially of silver, which tend to corrode along their periphery, such corrosion progressively spreading over their entire surface and leading to optical defects and loss of thermal performances.

Suggestions toward solving this problem have already been made. For example, U.S. Pat. No. 5,131,967 describes a technique using the laser to margin the reflecting coating deposited on the PET, thus preventing it from occupying a flush position. This technique seems to be cumbersome, however, and it substantially lengthens the production time, since the laser must achieve ablation of the reflecting coating over a peripheral strip of non-negligible width.

Another suggestion was made in U.S. Pat. No. 5,320,893: this document teaches making a cut in the thickness of the PET ply, around the periphery thereof, so that the peripheral corrosion of the reflecting coating will be stopped from spreading by this break line. It is not certain that a simple line will be able to prevent all spreading of corrosion in this way.

SUMMARY OF THE INVENTION

The purpose of the invention is therefore new processes for manufacture of this type of glazing unit, wherein the quality of the reflecting coating is preserved in the zones of visibility, while the aforesaid disadvantages are remedied, in particular while being relatively simple to use and at the same time having great efficacy and reliability.

The primary object of the invention, therefore, is a first process for manufacture of a laminated glazing unit comprising at least two rigid substrates of the glass type assembled by an intermediate film comprising at least one ply based on a polymer or polymers provided on at least one of its faces with a thin layer or a stack of thin layers having thermal properties, especially properties of reflection in the infrared. This process includes the following stages:

a)—the intermediate film in "complete" form or already containing at least the ply provided with the thin layer or layers is cut to dimensions essentially identical to or larger than those of at least one of the two substrates, b)—the said intermediate film is incised through at least the thickness of the ply provided with the thin layer or layers, in such a way as to define, in the said ply, at least one peripheral zone localized between the incision line and the edge thereof, c)—the intermediate film is assembled in "complete" form between the two substrates possibly by adjoining thereto any polymer ply or plies thereof which was or were missing in case it was not previously in "complete" form, d)—the peripheral zone or zones is or are detached from the intermediate film by pulling them mechanically, e)—the laminated glazing unit is then transformed.

Here and throughout the text hereinafter, the thin layer or layers having thermal properties, especially properties of reflection in the infrared, will be referred to as the "functional layer or layers". Under this term, the invention also comprises one or more thin layers which may also have other properties, especially optical or electrical, in addition to or instead of thermal properties.

Within the meaning of the invention, "assembly" is understood as the operation comprising correctly positioning all the elements of the laminated glazing unit correctly relative to each other before performing the operation in which they are finally unified.

Within the meaning of the invention, "transformation" is understood as the unification operation, which is generally performed with application of pressure and input of heat.

Finally, the intermediate film has already been described as being complete or not complete in stage a). Within the meaning of the invention, "complete" must be understood as the intermediate film already containing all the polymer plies of the final laminated glazing unit, in particular a sequence of the type PVB/PET/functional layer or layers/PET/PVB (or in other words the polymer support of the functional layer or layers already embraces the two plies of polymer of thermoplastic type that will permit assembly thereof with the rigid substrate or substrates of the window-glass type in the final glazing unit). In stage a), it may already be in complete form and contain all of these plies. However, it may also be incomplete, containing only part thereof, the remaining polymer plies then being added during assembly, while superposing them on the "incomplete" intermediate film which has been incised according to stage b).

The "incomplete" intermediate film on which the incision is made may therefore contain only the sequence of the type PVB/PET/functional layer or layers (or in other words the polymer support provided with the functional layer or layers alone or combined in only one of the plies of thermoplastic polymer that will permit assembly thereof with a window-glass substrate or substrates).

In general, therefore, the process according to the invention comprises stages (a) to (e).

According to a first variant, the stages are performed successively in the order in which they were listed hereinabove.

According to a second variant, the order in which these stages are performed may be modified, in particular by reversing the order of stages (c) and (d), or in other words by removing the peripheral zones of the intermediate film incised according to stage (a) before proceeding with assembly. In this way it is possible, in particularly preferred manner, to perform incision according to stage (a) of the incomplete intermediate film, especially of the type PVB/PET/functional layer or layers, then to detach the incised zones, before adjoining to the intermediate film its second PVB ply and assembling it with the two window-glass substrates. (Here and throughout the text hereinafter, the specific term PVB, which is merely an example, must be understood as any ply of thermoplastic polymer, while the specific term PET must be understood as any ply of polymer of flexible type capable of being provided with a functional layer or layers).

The process according to the invention is particularly advantageous: in fact, in the completed laminated glazing unit, the ply provided with the reflecting coating is effectively "margined" when the incision line follows its entire periphery, the margining having been performed in such a way that the reflecting coating (the functional thin layer or layers) is no longer disposed flush with the edge wall of the glass plates, thus considerably reducing and even completely eliminating the risks of corrosion via the edge walls.

The technique of the invention in fact permits "selective" margining, in the sense that the form of the incision line or lines can be modulated specifically in such a way that the margining for each configuration of glazing unit is matched to the scope of corrosion risks. Thus the margining can be chosen over a more or less broad peripheral strip of the ply depending on the glazing unit. In addition, in one and the same glazing unit, the width and form of the peripheral zones which will define margining of the ply can be varied, for example in order to "outline" the planned placement between substrates and ply of elements which tend to pose corrosion risks or to create weak spots in the peripheral imperviousness, for example, as will be detailed hereinafter, elements for connecting circuitry, sensors, radio antennas, or in order to allow for special geometric forms of the glazing units.

The technique according to the invention is therefore particularly flexible and permits margining which is particularly modulable geometrically and particularly precise. Thus the incision line or lines may be chosen so as to follow the form of the edge walls of the substrates very precisely, in smaller proportions, especially in such a way that the ply, once the glazing unit is completed, has the same roundings at the corners as do the substrates themselves, giving a fully esthetic impression. It is also possible to provide broader margining in the zones in which the edge walls of the glass plates have very specific forms, for example pointed forms, which may create weak points for attack by moisture.

The technique of the invention is in addition easy to use, most particularly during the assembly phase. In fact, it is easy to position the intermediate film correctly relative to the two glass plates, since the intermediate film is at least as large as those plates. (If larger, it is merely necessary to perform final clipping). It is a little more difficult to have to position an intermediate film which has already been margined and has smaller dimensions than those of the two glass plates, because in this case an almost constant distance relative to the edge walls of the glass plate must be provided all around its periphery.

Advantageously, the ply provided with the reflecting thin layer or layers is based on a flexible polymer or polymers, usually transparent or substantially transparent, especially belonging to the polyester family, of the linear polyester type, such as polyethylene terephthalate (PET), polycarbonates, polypropylene, polyethylene, polyether sulfides, polysulfides, and in general polymethacrylates. PET is particularly suitable for this application.

Preferably the intermediate film is "composite" in the sense that it comprises a plurality of polymer-base plies. Advantageously it has a configuration in which the ply provided with the thin layer or layers, especially of PET, is disposed between at least two plies based on a thermoplastic polymer or polymers, which are well suited to assembly by lamination together with rigid substrates of the glass type. More particularly, the plies can be based on polyvinyl butyral (PVB) or on a polyurethane or polyurethanes (PU).

In the case of such a "composite" intermediate film, when an incision is made in the ply provided with the thin layer or layers in stage (b), an incision is simultaneously made in the ply or plies topping it (and possibly to some extent in the underlying plies as well). In fact, the simplest approach is to perform this stage (b) on the complete intermediate film, once all of its constitutive plies have been assembled. Incision of plies "above" the functional ply with a thin layer or layers does not pose any problem of peripheral imperviousness. In fact, during mechanical detachment of the functional ply in stage (d), especially when it comprises PET, the ply or plies associated therewith in the intermediate film, of PVB type, and which themselves may have been incised during stage (b), remain in place between the two rigid substrates: during transformation, generally using at the same time means of the suction ring type for applying peripheral vacuum, means for applying pressure on the glazing unit and heating means, in the case of a composite intermediate film of the PVB/PET/PVB type, the two PVB plies joined together in the peripheral zones where the PET ply has been removed coalesce with each other, thus creating an impervious seam relative to the edge of the PET ply provided with the thin layer or layers. Preferably, during stage (d), only the peripheral zone or zones of the ply provided with a layer or layers is or are detached. It must be noted that, in the case of an intermediate film of the PVT/PET/PVB type, the incision stage can be performed on the "incomplete" intermediate film comprising two-ply PVB/PET, and the second ply of PVB will then be added during assembly.

The incision according to stage (b) can be performed in different ways: a cut can be provided by stamping or by a movable tool provided with a slicing element of the blade or laser type. This latter variant is more advantageous, because the movement of the movable tool can be controlled in automated manner by modifying its path and/or its cutting depth as desired, along the desired incision line or the dimensions of the laminated glazing unit to be fabricated, by simple reprogramming of the movable tool by computerized/electronic means. In particular, cutting devices of the type sold commercially by the ARISTO or Z ÜOND companies can be used.

As regards the choice of the layer or stack of layers designed to endow the glazing unit with thermal properties, especially reflection in the infrared, there can be chosen at least one substantially metallic layer, especially based on at least one of the following metals: silver, copper, gold, nickel, chromium, indium, tantalum, niobium, aluminum, especially an alloy of the nickel-chromium type or one belonging to the family of steels, or else one based on a metal nitride of the type TiN, ZrN or else based on doped metal oxide or oxides such as tin oxide doped with fluorine ($SnO_2$:F) or indium oxide doped with tin (ITO). In fact, the criterion is such that the layers can be deposited on polymer substrates of PET type by known techniques.

There can be used a single layer of this type or a plurality separated by layers based on dielectric materials of the metal oxide type ($Nb_2O_5$, $Ta_2O_5$, ZnO, $In_2O_3$, $TiO_2$, $SnO_2$, $Al_2O_3$, $WO_3$, etc.) or nitride of the $Si_3N_4$ type or other materials of the $MgF_2$ type.

For more information on stacks of this type, it is possible in particular to consult European Patent EP 0438357, which describes a layer based on tantalum, European Patent EP 0511901, which describes a layer based on nickel-chromium alloy, steel or tantalum associated with dielectric layers of the $SnO_2$, $TiO_2$, $Ta_2O_5$ type. It is also possible to consult European Patents EP 0506507, EP 0611213, EP 0636587, EP 0678484, EP 0718250 for stacks which use a layer of silver between at least two layers of dielectric material, or else European Patent EP 0638528 for stacks which use two layers of silver with a layer or layers of dielectric material interposed therebetween.

To facilitate detachment by mechanically pulling the "incised" peripheral zones of the ply provided with the thin layer or layers during stage (d), it can be advantageously provided that these peripheral zones have dimensions such that they locally "overhang" the edge walls of the rigid substrates once the intermediate film has been positioned therebetween, especially in the form of a starting tab or tabs on which it is easy to exert mechanical pulling action to detach the said peripheral zones. To facilitate detachment, it is preferable to provide these tabs in the extension of at least one of the edges of the glass plates.

According to a particular variant of the invention, it can be provided that the thin layer or layers having thermal properties is or are provided with electricity supply means. In this way they can be endowed as desired with a heating-layer function, which is particularly useful for demisting or deicing the glazing units, especially those constituting equipment of vehicles of the windshield type, where visibility is imperative. What then remains is development of the placement of the connecting circuitry permitting them to be supplied with electricity, in such a way that the operation of detachment of the peripheral zones during stage (s) of the process of the invention does not cause damage.

According to another variant of the invention, it is also possible to provide, in one of the faces of at least one of the plies which constitutes the intermediate film and which is not in contact with the layer or layers having thermal properties, a heating layer or a network of heating wires together with their appropriate connecting circuitry. The simplest configuration, in an intermediate film of type PVB/PET/layer or layers having thermal properties/PVB, consists of providing on one of the faces of the PVB designed to be placed in contact with the rigid substrate of the glass type, a network of heating wires which is caused in known manner to become "inlaid" on its surface. This network, again in known manner, is supplied by oppositely disposed current leads which are sometimes called "busbars" and are made of strips of metal of the copper type. The dimensions of this network and the positioning of these "busbars" with respect to the edge of the laminated glazing unit can remain identical to the dimensions and positionings of this type of heating network of a "standard" laminated unit, where the intermediate film is made merely of one thermoplastic ply of the PVB type. In fact, according to the process of the invention, only the ply of the intermediate film which is provided with the thin layer or layers having thermal properties is "margined" in the final laminated glazing unit, while the other polymer plies associated therewith, especially that of PVB, remain in place and have dimensions adjusted exactly to those of the two glass plates. Advantageously, the network of heating wires is dimensioned in such a way as to be spaced by at most 1 cm, especially about 6 to 8 mm, from the edge wall of the glass substrates of the glazing unit once it has been laminated.

The "incision line" in the ply provided with the layer or layers having thermal properties, which will determine the peripheral zones to be ultimately detached from the said ply, can have very varied profiles depending on the needs. Thus, in the simplest configuration, it can "follow", at least partly and in smaller proportions, a profile which is identical or close to that of the edge walls of the rigid substrates of the glass type. In this way there is achieved margining of the ply which is esthetic, regular, extremely precise and which can easily conform to and follow the "roundings" of the glass plates.

The said line can therefore be chosen in such a way that, once assembly has been completed, there exists, between the edge wall of the ply and the edge walls of the rigid substrates of the glass type, a margin which is always at least 3 mm, especially at least 5 mm, preferably about 6 mm. In this way there is assured sufficient distance between the edges of the thin layer or layers having thermal properties and the edges of the glazing unit itself, thus avoiding any risk of corrosion of the layer or layers via the edges.

Although the laminated glazing unit is more complex in the sense that it contains elements inserted between the glass substrates and the intermediate film, it is possible as a consequence to adapt the incision line in such a way that it "enclaves" the said elements: once the peripheral zones have been detached along this line, these elements will therefore be in contact with the plies of the intermediate film which are not provided with the layer or layers having thermal properties, and the ply provided with this layer or these layers has dimensions such that it "outlines" them. The advantage once again is to protect the thin layer or layers in the zones where it or they would be more susceptible to corrosion attack, due to penetration of moisture, for example, especially such zones in which elements in addition to the materials specific to the laminated glazing unit are present. Such elements can include all the elements of the connecting circuitry, for example those cited hereinabove for supplying a network of heating wires, more particularly in the junction zone between the collectors (busbars) and the current leads. They can also be sensors of types such as volumetric sensors, moisture sensors, ultrasonic sensors, sensors of the type used in remote toll-charge recording. They can also be electronic elements of the electronic chip type, or wave transmitter/receiver elements of the radio antenna type.

According to one variant of the invention, it is also possible, during stage b) of incision of the intermediate film, to provide for incisions to be made along a closed line, to create "windows" in the central part, or in other words not at the periphery, of the ply provided with its thin layer or layers.

Once these "windows" have been incised, they can be manually detached from the intermediate film before the assembly stage. This internal margining makes it possible to insert diverse elements in the non-peripheral portion, especially all types of sensors, electronic elements cited hereinabove, such as remote sensors for toll-charge recording or antenna elements for systems such as the "G.P.S." (a technique of identifying locations by satellite, otherwise known as "Global Positioning System". It has also proved useful without adding any element in the "window" thus created, especially for use as a window which allows electromagnetic waves to pass (application to remote toll-charge recording).

According to the invention, it is possible during stage (d) to provide for masking, by means of an opacifying coating, of all or part of the zones of the intermediate film corresponding to the zones ("windows" and/or border of the ply) extracted from the ply provided with the layer or layers having thermal properties. This coating can be deposited directly on one of the faces of one of the glass substrates, especially by deposition of enamel. The deposit can be applied on the outwardly directed glass face or on the glass face designed to be located on the side next to the intermediate film, this latter type of deposit being described in particular in International Patent WO-94/22779. The opacifying coating can also be deposited by an ink-jet or silk-screen printing technique, on one of the glass plates or on one of the faces of one of the polymer-base plies associated with the ply provided with the thin layer or layers having thermal properties in the intermediate film. It can also be a deposit of opaque paint, especially one based on polyurethane. If this deposit is applied on the glass face turned toward the intermediate film, it is useful to provide a paint having good compatibility with the polymer with which it will be in contact, in order to be sure of good adherence between glass and polymer in the paint zone.

It is also possible to opacify the border of one of the PVB plies in an intermediate film of the PVB/PET/PVB type, and even to color it throughout. It is in fact advantageous to use already existing plies of the PVB type which are provided at the periphery with a strip colored throughout, especially in blues or greens, possibly with a gradation of color, especially toward the interior of the ply.

By such masking it is ensured that, once mounted, slightly clearer zones, of slightly different shade corresponding to the "margined" zones, cannot be distinguished at the periphery of the laminated glazing unit from the ply provided with the layer or layers. However, this is not indispensable at the esthetic level: in fact, the invention makes it possible to obtain a very sharp, very precise "transition", which ultimately is esthetic in itself, which does not necessarily have to be concealed.

A particularly preferred embodiment according to the invention comprises manufacturing a laminated glazing unit made of two glass substrates assembled by a "three-layer" intermediate film, of which one layer is a PET ply provided with at least one infrared-reflecting layer of the metallic type, disposed between two plies of thermoplastic polymer of the PVB type, the ply and its layer being set back from the edge walls of the two glass plates and these two thermoplastic plies acting by mutual adhesion to seal the periphery from the outside. In fact, assembly of a laminated glazing unit is generally achieved by heating and application of pressure, especially by passing the preassembled glazing unit through an autoclave: in fact, when the edges of the two PVB plies become tacky and soft, they become unified in the peripheral zone where the ply of PET type has been margined, perfectly sealing in the reflecting layer.

As mentioned hereinabove, elements of types such as elements of connection circuitry, sensors, antennas, electronic elements are inserted if desired in these "set-back" zones and/or in the "windows" cut in or at the edge of the ply of PET type, such elements thus being "embedded" in the PVB or at the PVB/glass interface.

Another object of the invention is a process for manufacture of the same type of glazing unit, which meets the same criteria as for the preceding process and which represents a special embodiment thereof.

This second process includes the following stages:
a)—the intermediate film in "complete" form or already containing at least the ply provided with the thin layer or layers is cut to dimensions essentially identical to or larger than those of at least one of the two substrates (stage identical to that of the first process),
b)—the intermediate film is incised through at least the thickness of the ply provided with the thin layer or layers, one "inside" the other, in such a way as to define at least one zone between these two lines,
c)—at least the ply provided with the thin layer or layers is extracted from the intermediate film in this zone defined by the two incision lines,
d)—the intermediate film is assembled in "complete" form between the two substrates by adjoining thereto any polymer ply or plies thereof which was or were missing in case it was not previously in "complete" form (stage identical to stage c) of the first process),
e)—the laminated glazing unit is then transformed (stage identical to stage e) of the first process).

(The terminology is the same as for the preceding process).

By incision lines "one inside the other" there are understood here two lines such that the inner area defined by one of the two lines is disposed completely inside the inner area defined by the other line. In fact, the PET ply of the intermediate film is not "margined" in this case, but instead there is extracted therefrom a border, a "trough" at a distance close to the edge wall of the intermediate film, said border, "trough," corresponding to the zone of the ply which is located between the two incision lines and which will be extracted before assembly. This therefore does not prevent the possibility that incipient corrosion of the thin layer or layers could develop on the external periphery of the glazing unit once it has been transformed, but such incipient corrosion will be completely "stopped" by this trough, which creates in the layer or layers a sufficient discontinuity that propagation of corrosion toward the central portion of the glazing unit is prevented. It may be possible to mask the periphery of the glazing unit where traces of corrosion can develop, especially by an opacifying coating such as those described in the context of the first process.

In this specific embodiment, just as in the more general process according to the invention mentioned hereinabove, it must therefore be understood that, in the final glazing unit, the integrity of the functional layer is preserved in the zone of visibility of the glazing unit, with two kinds of forms in particular:
either the layer (and its support) is truly margined, in which case the entire layer remaining in the final glazing unit is protected,
or, by virtue of the trough described hereinabove, margining does not take place, in the sense that the layer and its support are not necessarily set back from the edge walls of the glass plates of the final glazing unit, but the central zone of the layer defined by the "innermost" incision line remains integrated, while the zone of the layer outside the trough, or in other words the extreme peripheral zone, is considered to be "sacrificed" and no longer part proper of the "operational"/ "effective" functional layer within the meaning of the invention.

The width of the "trough" can be adjusted as desired. It can assume the form of a strip of constant thickness, whose profile follows that of the edge walls of the glass plates, but in smaller proportions. It can also be of variable width, and in particular can be wider in the zones most susceptible to corrosive attack.

This trough can be extracted before assembly by manual or automated mechanical pulling action. If the incision is made not only over the thickness of the ply provided with a layer or layers of the PET type but also over the ply which covers it and which constitutes part of the intermediate film, for example of PVB, it may be preferable, once extraction has been accomplished, to add a PVB strip of suitable dimensions in the extracted zone, so that the quality of lamination does not suffer from the presence of an intermediate film which is less thick locally. This is not indispensable, however, especially when the width of the "trough" is small, which is generally the case (on the order of 1 to 3 mm, for example).

Another object of the invention is a process for manufacture of the same type of glazing unit, which meets the same criteria as for the two preceding processes.

This third process includes the following stages:
a')—the intermediate film is cut to dimensions smaller than those of the two glass substrates,
b')—the intermediate film is positioned in contact with one of the two glass substrates, in such a way that it is set back at least in part from the edge walls of the glass plates,
c')—one or more polymer-base strips, especially of thermoplastic polymer of the PVB type, is or are disposed on the glass face turned toward the intermediate film left bare where said ply is set back,
d')—this first glass plate provided with the intermediate film and this strip or strips is assembled together with the second glass plate, then the usual transformation to a laminated glazing unit is effected.

In this case, "intermediate film" must be understood as the same structure and nature of materials as in the scope of the preceding processes (of the type PVB/PET/layer or layers/PVB).

For stage (a'), there is chosen a size of intermediate film such that the desired margining is obtained de facto, generally in "standard" forms with square corners, although it is not prohibited from having a more complex, modulated profile.

For stage (c'), one or more strips of thermoplastic polymer is or are used in the margined zones, and they in fact act as a sealing peripheral seam which guarantees the imperviousness of the thin layer or layers having thermal property or properties, and of the laminated glazing unit in general.

PVB-base strips are chosen which have optimal compatibility with the thermoplastic polymer plies of the intermediate film framing the ply provided with the thin layer or layers which, as has been seen hereinabove, are also usually based on PVB. The strips can have a form exactly complementary to the form of the intermediate film in order to be flush with the edge walls of the glass plates, or they can have smaller dimensions and slightly simpler form: during assembly, this strip or these strips tend in fact to flow under the effect of heat and/or pressure and in doing so fill every available interstice, while any "overhang" that may occur necessitates final trimming.

It is possible to attempt to achieve a maximum imperviousness effect by appropriately selecting the composition of this strip or these strips. Thus, although the base thereof may be PVB, its formulation has been optimized to reinforce its moisture-barrier properties, for example by inclusion of appropriate additives known to those skilled in the art.

This strip or these strips can be deposited either manually by an operator or by an appropriate device, especially of automated type.

BRIEF DESCRIPTION OF THE DRAWINGS

The invention will be described in more detail hereinafter by means of non-imitative embodiments with reference to the following figures.

DETAILED DESCRIPTION OF THE PREFERRED EMBODIMENTS

For more clarity, these figures are meant to be extremely schematic and, in particular, they do not represent the proportions between the dimensions, especially the thicknesses, of the different materials shown.

EXAMPLE 1

Figure 1:
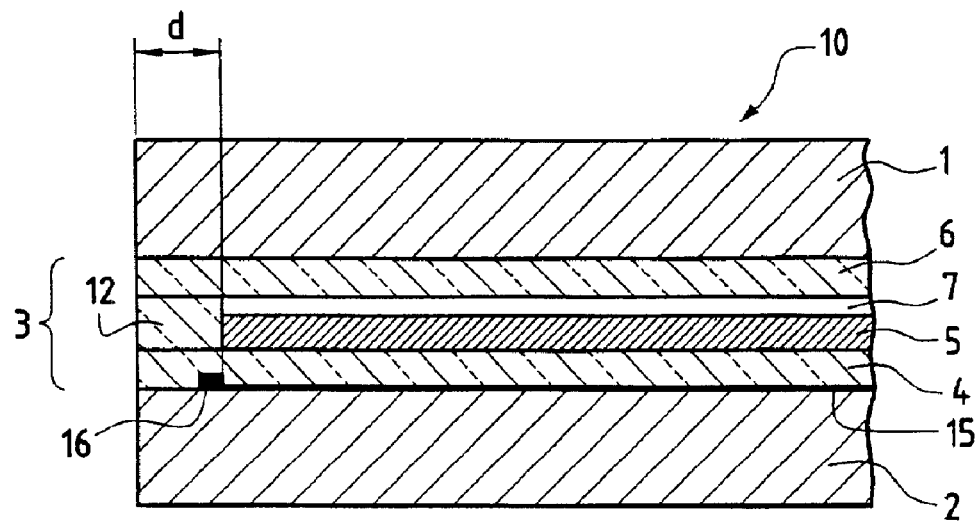
FIG. 1: the laminated glazing unit, completely assembled according to the first and second processes of the invention.
Figure 2:
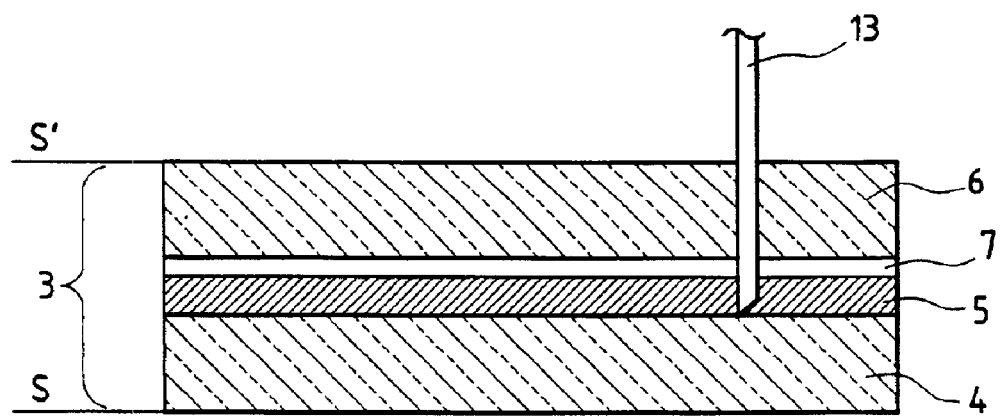
FIGS. 2 and 3: stages in manufacture of the glazing unit of FIG. 1 according to the first process.
Figure 3:
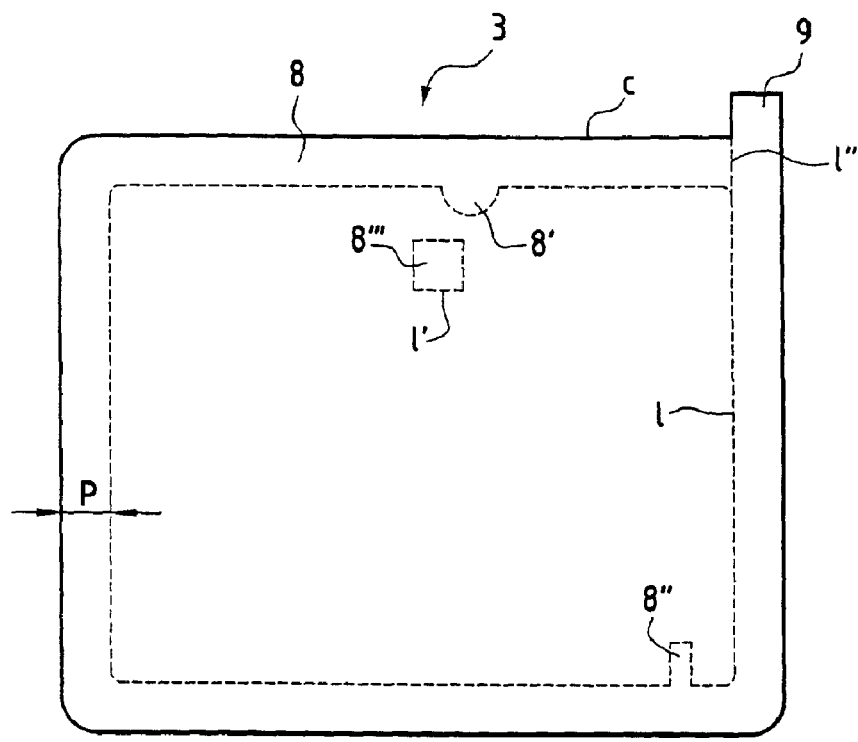

This example relates to FIGS. 1 to 3 and to the first process according to the invention. FIG. 1 represents a section through the completed laminated glazing unit 10. It is a vehicle windshield. Therein there are seen the two rigid substrates 1, 2 of soda-lime glass with thickness of approximately 2 to 3 mm, assembled by an intermediate film 3 comprising a central ply 5 of PET, which is coated on one of its faces by a coating 7 having solar protection properties, and which is disposed between two PVB plies 4, 6. The two glass plates 1, 2, shown as plane, can in fact be curved:

PET ply 5 has a thickness of 50 $\mu$m, each of the two PVB plies 4, 6 has a thickness of 0.38 mm, coating 7 comprises a first layer of dielectric material of the $In_2O_3$ type, topped by a reflecting layer of silver, in turn topped by a layer of dielectric material of the $In_2O_3$ type. This type of stack is described with more details in, for example, International Patent WO-92/10632, and it has a square ohmic resistance of about 4 ohm/square.

PET ply 5 is margined for a distance (d) (variable distance) over its entire periphery relative to the edge walls of the two glass plates 1, 2.

On the face of PVB ply 4 turned toward the glass plate 2 there can be inlaid a network of heating wires 15 with its ad hoc current collectors 16.

In the margined zone of PET ply 5 provided with coating 7, the two PVB plies 4, 6 have been unified to form an impervious seam 12.

The process of manufacture of such a glazing unit takes place in the following sequence:

As shown in section by FIG. 2, the intermediate film 3 cut to dimensions almost identical to those which it must have to be just flush with the edge walls of the glass plates 1, 2 once it is positioned therebetween is placed in position on an appropriate reference surface S. A cutting tool, of which merely the slicing blade 13 is shown, and which is positioned relative to the said surface S (or relative to the reference surface S' following the external face of PVB ply 6), is made to incise the thickness of the "upper" PVB ply 6 and that of the ply 5 provided with its coating 7. As shown in FIG. 3, once the intermediate film has been incised, seen from above, this line I follows the periphery c of the edge wall of the intermediate film 3, in smaller proportions, in such a way as to define a peripheral zone 8 of variable width p, defining in particular two rounded "enclaves" 8' and 8" at the level of two of the edges of the intermediate film. A window 8''' is also provided, by incision to the same depth along a closed line I'. There is also provided a "starting tab" 9 in the extension of the smallest edge of the intermediate film 3, or in other words a small surface designed to "overhang" the glazing unit once the intermediate film 3 has been positioned between the two glass plates 1, 2, together with an incision line I'' designed to facilitate "tearaway" of this tab during detachment of zone 8. The window 8''', or in other words the incised zone of ply 5 and PVB ply 4, is then manually detached and then, at the position of the window, there is added a PVB "patch" of size adjusted to the dimension of zone 8''', in such a way as to preserve substantially uniform thickness of the intermediate film 3. (Another solution consists, for example, in incising only ¾ of the periphery I', removing the incised PVB zone 6, completely pulling off the zone of ply 5 corresponding to the window, then replacing the incised PVB zone 6. There is then no reason to add the preceding "patch", since the thickness of intermediate film 3 has been substantially maintained). The intermediate film 3 incised in this way is then positioned between the two glass plates 1, 2. These three elements are held in position, then the starting tab 9 is pulled, with the result that the peripheral zone 8 solely of the PET ply 5 provided with its coating 7 is detached from the glazing unit. To facilitate this operation, it is possible to provide a second starting tab, preferably located in the corner diametrically opposite the first. The peripheral zone of PVB ply 6, which has itself been incised, remains in place because of the fact that it adheres more strongly to the glass plate 1 than to PET 5, even before any true transformation operation.

In this way, PET ply 5 has been margined in a completely modulable manner. For example, the rounded enclave 8' has a form designed such that, in this zone, an element of the sensor or chip type can be inserted between glass plate 1, 2 and intermediate film 3, the enclave 8" can correspond advantageously to the zone of the junction between the collectors 16 and the current leads, and the window 8''' can permit the insertion of a sensor for remote toll-charge recording or of a G.P.S. antenna. In this way the coating 7 "avoids" any contact with these sensors and zones of electric junction and, in general, outlines all the zones most susceptible to being attacked, especially by moisture.

EXAMPLE 2

Figure 4:
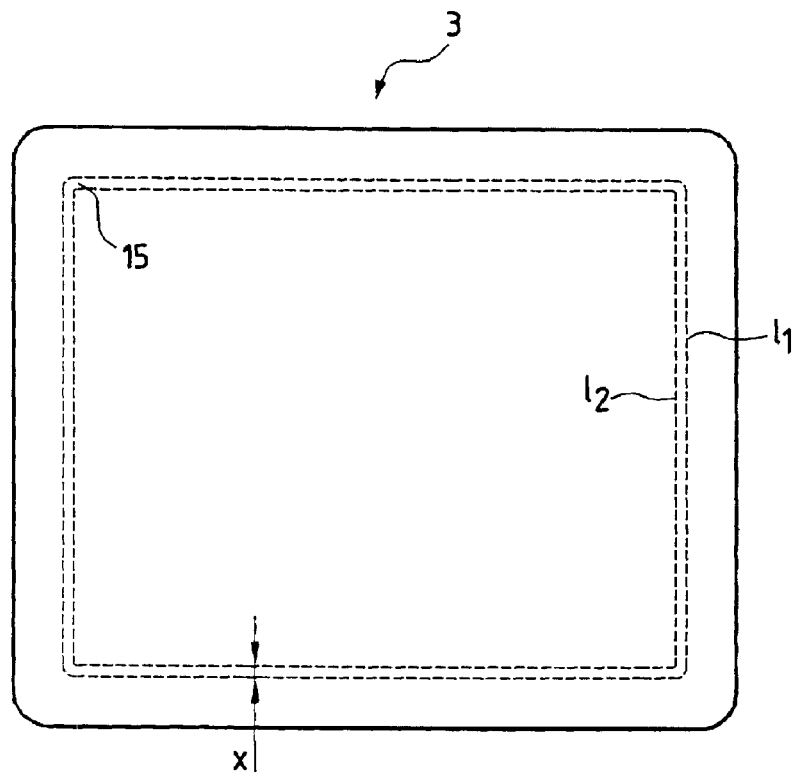
FIG. 4: one stage in the manufacture of the laminated glazing unit according to the second process.

This second example relates to the second process of the invention, which uses technical means quite similar to those of the first process, as shown in FIG. 4.

The difference lies in the manner in which the thickness of the assembly comprising PET(5)/layers(7)/PVB(7) shown in FIG. 2 is incised; in this case, two closed incision lines $I_1$ and $I_2$ are made, incision line $I_2$ being disposed inside the area defined by incision line $I_1$, so as to create a zone 15 disposed between lines $I_1$ and $I_2$. FIG. 4 represents the simplest embodiment, wherein this zone 15 has the form of a narrow strip of constant width "following" the edge of the intermediate film 3. Incision $I_1$ is made at approximately 4 to 8 mm from the edge of the intermediate film, especially at 6 mm, while incision $I_2$ is made in such a way that the zone 15 has a minimum width of 1 mm and especially of approximately 1 to 2 mm.

Once the two incision have been made, this zone 15, which therefore comprises the stack of PET/layers/PVB, is then extracted, thus creating a "trough" in the intermediate film and assuring a discontinuity in the layers (7).

The next step is the customary process of assembly and transformation of the glazing unit. The obtained glazing unit, in contrast to that according to FIG. 1, therefore contains a PET play and a flush coating 7, but with a discontinuity at the level of extracted zone 15, thus preventing propagation of corrosion from the edge of the glazing unit. In this case the extracted zone 15 has a width x of hardly 1 mm, which is therefore of sufficiently small size that the reduced thickness of the intermediate film at this position does not cause any defect in lamination of the glazing unit. The following options are also possible:

either to make the incisions only on the "incomplete" intermediate film devoid of the last PVB layer 7, which will be added at a later time, or to make the incisions on the "complete" intermediate film and, after extraction of the zone 15, to add a little polymer to preserve an almost constant thickness of the intermediate film.

EXAMPLE 3

According to the third process of the invention, there is obtained a laminated glazing unit quite similar to the first, with the same elements. The difference lies in the nature of the impervious seam 12 according to FIG. 1. In this case the seam is of inlaid nature, which does not originate, or not exclusively, from flow of the two PVB plies 4, 6, and the chemical composition of which has been selected to be particularly impervious to liquid water and water vapor.

Figure 5:
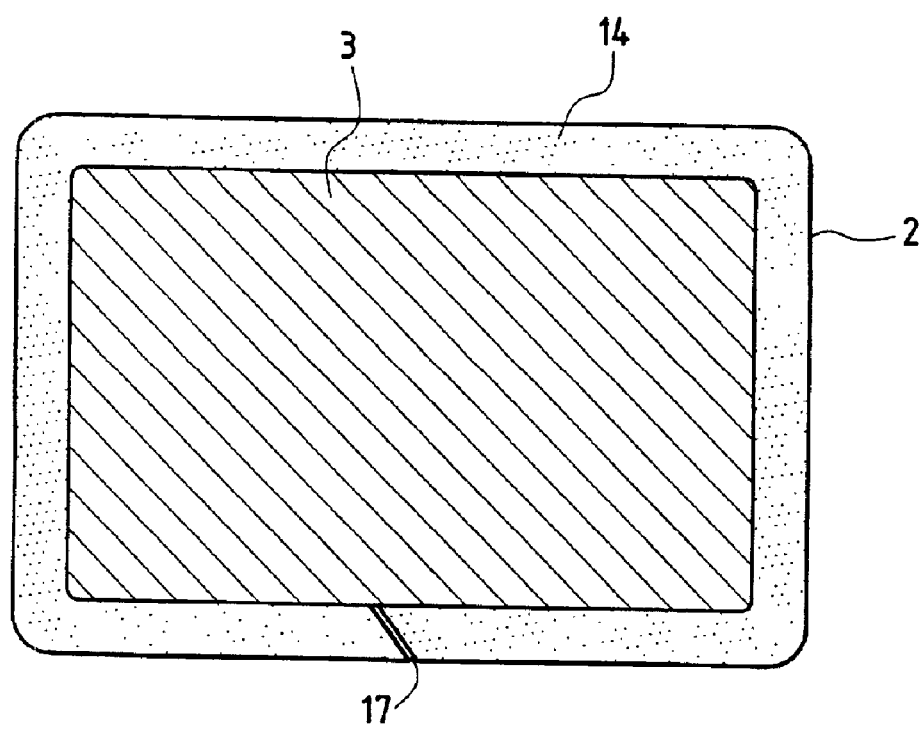
FIG. 5: one stage in the manufacture of the laminated glazing unit of FIG. 1 according to the third process of the invention.

The manufacture process takes place in the following manner:

the entire intermediate film 3 is initially cut out to dimensions smaller than those of glass plates 1 and 2, with square corners, then, as shown in FIG. 5, the intermediate film 3 is positioned on the first glass plate 2, then an "impervious" PVB strip 14 is placed in the glass zones left exposed. For more simplicity, this strip can be of simple geometric form, which is obtained, for example, from a ribbon of parallelepiped section and adequate thickness relative to that of the intermediate film, which ribbon is positioned around the intermediate film 3. It could also comprise four strips, one for each of the edges left exposed. During transformation, this strip 14 flows to occupy the entire interstice left free by intermediate film 3 between glass plates 1, 2. In fact, intermediate film 3 is dimensioned specifically to ensure that its dimensions are equal to those of the glass plate 2 less the width of strip 14 used.

After this strip 14 has been positioned, the only steps remaining are to position the second glass plate 1, then to proceed with assembly by customary techniques.

It must be noted that the junction zone 17 between the start and end of strip 14 is preferably oblique relative to the edges of glass plates 1, 2, to guarantee good imperviousness at this level, even in the case of a junction that is not completely continuous.

According to the first, second or third process, the laminated glazing unit according to the invention, by virtue of coating 7, exhibits interesting solar protection properties: it can have light transmission values $T_L$ on the order of 76 to 78%, light reflection values $R_L$ of at most 10%, energy transmission values $T_E$ of at most 50% and infrared reflection values greater than 45% (measured with the $D_{65}$ illuminant).

What is claimed is:

1. A process for manufacture of a laminated glazing unit comprising at least two glass substrates assembled by an intermediate film having at least one ply based on a polymer or polymers provided on at least one of its faces with a functional thin layer or a stack of functional thin layers having properties of reflection in infrared, wherein the process includes the following steps:
   a)—the intermediate film already containing at least the ply provided with the thin layer or the stack of thin layers is cut to dimensions larger than at least one of the two glass substrates,
   b)—the intermediate film is incised through at least a thickness of the ply provided with the thin layer or the stack of thin layers having properties of reflection in infrared, in such a way as to define at least one peripheral zone or zones of said ply localized between an incision line and an edge of the ply,
   c)—the intermediate film is assembled between the two glass substrates by adjoining thereto any polymer ply or plies thereof which was or were missing,
   d)—the peripheral zone or zones of the ply is or are detached by pulling it on them mechanically,
   e)—the laminated glazing unit is transformed, the steps taking place in the above order.

2. A process according to claim 1, wherein the incision line is made by stamping or by cutting with a movable tool provided with a slicing element or a laser.

3. A process according to claim 1, wherein the thin layer or the stack of thin layers having properties of reflection in the infrared is or are provided with an electricity supply to give the layer or the layers heating capability.

4. A process according to claim 1, wherein at least one of the faces of at least one ply which constitutes the intermediate film and which is not in contact with the thin layer or the stack of thin layers having properties of reflection in the infrared is provided with a network of heating wires.

5. A process according to claim 1, wherein the incision line at least partly follows, in smaller proportions, a profile similar or identical to that of edge walls of the glass substrates.

6. A process according to claim 1, wherein, before assembly (c), the intermediate film is also incised through at least the thickness of the ply provided with the thin layer or the stack of thin layers, in such a way as to define a line which is closed on itself, thus allowing windows to be created.

7. A process according to claim 1, wherein the ply is based on flexible polymers of linear polyester.

8. A process according to claim 7, wherein the linear polyester is one of polyethylene terephthalate (PET), polycarbonate, polypropylene, polyethylene, polyether sulfide, polysulfide and polymethacrylate.

9. A process according to claim 1, wherein the intermediate film comprises a plurality of polymer plies, wherein in particular the ply provided with the layer or the stack of thin layers having properties of reflection in the infrared is disposed between two plies based on thermoplastic polymers.

10. A process according to claim 9, wherein the thermoplastic polymers are one of polyvinyl butyral (PVB) and polyurethane (PU).

11. A process according to claim 1, wherein the intermediate film comprises a plurality of plies based on a polymer or polymers, and wherein the ply provided with the thin layer or the stack of thin layers having properties of reflection in the infrared is incised during step (b).

12. A process according to claim 11, wherein only the peripheral zone or zones of the ply provided with the layer or the stack of thin layers having properties of reflection in the infrared is or are detached during step (d).

13. A process according to claim 1, wherein the peripheral zone or zones of the ply is or are designed such as to overhang locally edge walls of the glass substrates.

14. A process according to claim 13, wherein the peripheral zone or zones of the ply is or are designed in a form of a starting tab or tabs on which mechanical pulling action is exerted to detach the peripheral zone or zones during step (d).

15. A process according to claim 1, wherein the thin layer or the stack of thin layers comprises at least one layer based on at least one metal belonging to the group comprising: silver, copper, indium, gold, nickel, chromium, aluminum, tantalum, niobium, or based on at least one doped metal oxide.

16. A process according to claim 15, wherein the at least one doped metal oxide is one of tin oxide doped with fluorine ($SnO_2$:F), indium oxide doped with tin (ITO) and metal nitride of the types TiN and ZrN.

17. A process according to claim 1, wherein the incision line defines a continuous peripheral zone on a ply in such a way that, once assembly has been completed, there exists, between the edge of the ply and edge walls of the glass substrates, a margin which is always at least 3 mm.

18. A process according to claim 17, wherein the margin is about 6 mm.

19. A process according to claim 1, wherein the incised peripheral zone or zones of the ply defined by the incision line designed so as to enclose elements designed to be inserted between the glass substrates and the intermediate film in the laminated glazing unit, so as to create windows to allow electromagnetic waves to pass there through.

20. A process according to claim 19, wherein the elements designed to be inserted include one of elements of connection circuitry, elements of a current-lead type, volumetric sensors, moisture sensors, electronic chips and radio antennas.

21. A process according to claim 1, wherein all or part of a zone or zones of the intermediate film corresponding to the peripheral zone or zones detached from the ply during step (d) are masked by an opacifying coating.

22. A process according to claim 21, wherein the opacifying coating is applied by one of depositing enamel on an outer or inner face of at least one of the glass substrates, silk-screen printing of ink on at least one of the faces of the at least one ply of the intermediate film, and by coloring a border of the at least one ply throughout in a form of a strip of graduated coloration.

* * * * *